(12) United States Patent
Hibino

(10) Patent No.: US 10,061,017 B2
(45) Date of Patent: Aug. 28, 2018

(54) TARGET RECOGNITION APPARATUS

(71) Applicant: DENSO CORPORATION, Kariya, Aichi-pref. (JP)

(72) Inventor: Katsuhiko Hibino, Anjo (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 326 days.

(21) Appl. No.: 14/772,719

(22) PCT Filed: Mar. 3, 2014

(86) PCT No.: PCT/JP2014/055268
§ 371 (c)(1),
(2) Date: Sep. 3, 2015

(87) PCT Pub. No.: WO2014/136718
PCT Pub. Date: Sep. 12, 2014

(65) Prior Publication Data
US 2016/0003936 A1 Jan. 7, 2016

(30) Foreign Application Priority Data

Mar. 4, 2013 (JP) .................................. 2013-041878

(51) Int. Cl.
*G01S 7/41* (2006.01)
*G01S 13/04* (2006.01)
(Continued)

(52) U.S. Cl.
CPC ............... *G01S 7/41* (2013.01); *G01S 13/04* (2013.01); *G01S 13/345* (2013.01); *G01S 13/42* (2013.01);
(Continued)

(58) Field of Classification Search
CPC ........ G01S 7/41; G01S 13/345; G01S 13/867; G01S 13/04; G01S 13/931; G01S 13/42; G01S 2013/9375
See application file for complete search history.

(56) References Cited

U.S. PATENT DOCUMENTS 9,423,498 B1 * 8/2016 Brown .................... G08G 1/16
9,667,921 B2 * 5/2017 Faber ..................... H04N 7/183
(Continued)

FOREIGN PATENT DOCUMENTS

EP 1316935 A1 * 6/2003 ............ B60W 30/16
JP 6-124340 A 5/1994
(Continued)

OTHER PUBLICATIONS

International Search Report; International Application No. PCT/JP2014/055268, filed Mar. 3, 2014; dated May 20, 2014; 12 pages.
(Continued)

*Primary Examiner* — Frank J McGue
(74) *Attorney, Agent, or Firm* — Knobbe, Martens, Olson & Bear, LLP

(57) ABSTRACT

A target recognition apparatus of one embodiment is installed in a vehicle, and includes a data acquisition means which acquires received data from a transceiver having a plurality of transmission and receiving channels which transmit and receive radar waves; an image acquisition means which acquires image data from an image sensor which picks up an image of a state around an own vehicle; and a detection means which detects a target which has reflected the radar waves based on the received data and the image data.

19 Claims, 8 Drawing Sheets

(51) Int. Cl.
*G01S 13/34* (2006.01)
*G01S 13/42* (2006.01)
*G01S 13/86* (2006.01)
*G01S 13/93* (2006.01)

(52) U.S. Cl.
CPC .......... *G01S 13/867* (2013.01); *G01S 13/931* (2013.01); *G01S 2013/9375* (2013.01)

(56) References Cited

U.S. PATENT DOCUMENTS

| | | | |
|---|---|---|---|
| 2008/0122681 A1 | 5/2008 | Shirakawa | |
| 2009/0251355 A1 | 10/2009 | Nanami | |
| 2010/0007476 A1 | 1/2010 | Klotz et al. | |
| 2011/0050482 A1* | 3/2011 | Nanami | B60T 7/22 342/52 |
| 2012/0177250 A1* | 7/2012 | Nakano | G06K 9/00798 382/103 |
| 2013/0194127 A1* | 8/2013 | Ishihara | G01S 13/18 342/70 |
| 2015/0268328 A1* | 9/2015 | Johnson | G01S 7/03 342/21 |
| 2017/0197540 A1* | 7/2017 | Hibino | B60Q 1/143 |

FOREIGN PATENT DOCUMENTS

| | | |
|---|---|---|
| JP | 2006-163879 | 6/2006 |
| JP | 2006-234513 A | 9/2006 |
| JP | 2008-008870 | 1/2008 |
| JP | 2009-019914 | 1/2009 |
| JP | 2009-229374 A | 10/2009 |
| JP | 2009-281775 A | 12/2009 |
| JP | 2010-020414 | 1/2010 |
| JP | 2011-150633 | 8/2011 |
| WO | 2014136718 | 9/2014 |
| WO | WO 2014136718 A1 * | 9/2014 ............. G01S 13/42 |

OTHER PUBLICATIONS

International Preliminary Report on Patentability; International Application No. PCT/JP2014/055268; Filed: Mar. 3, 2014 (with English translation).

* cited by examiner

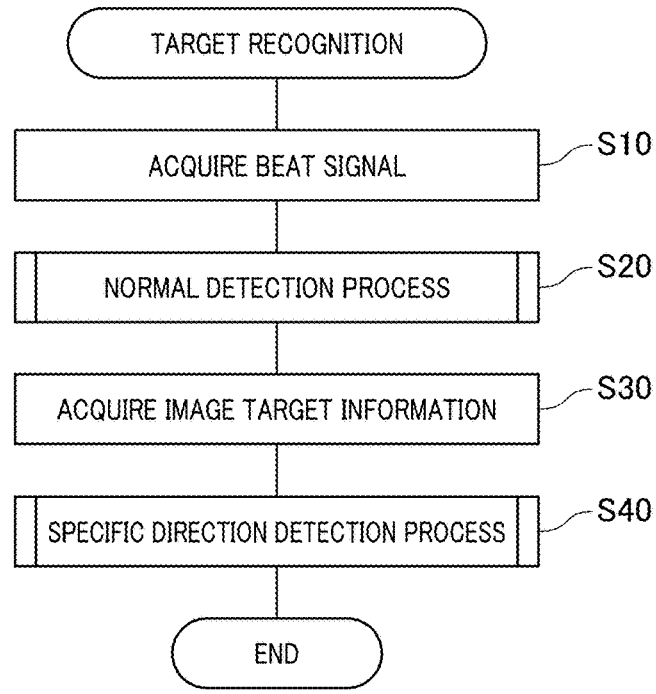
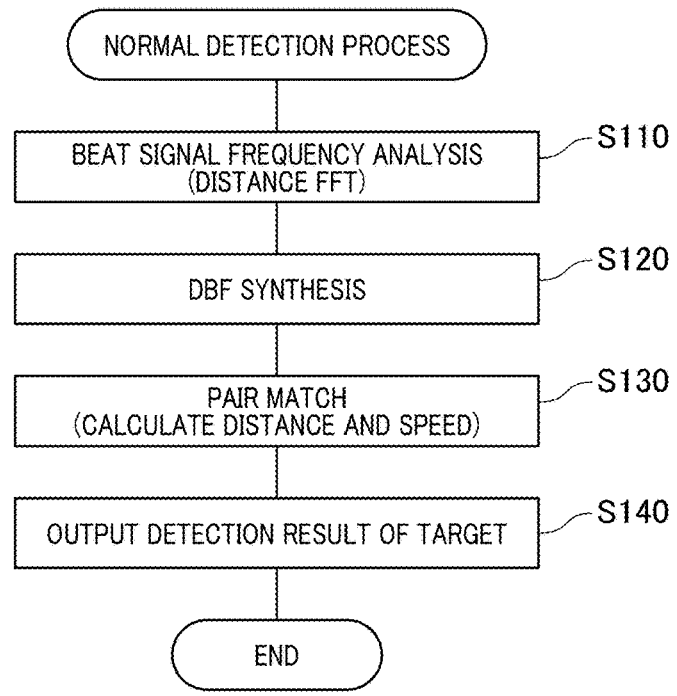

FIG.6
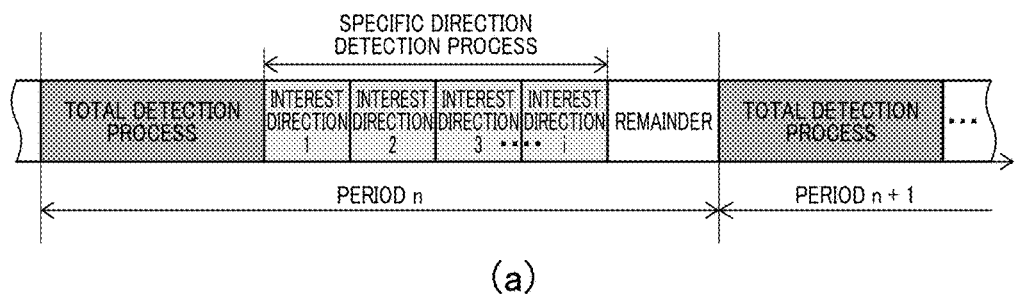
(a)
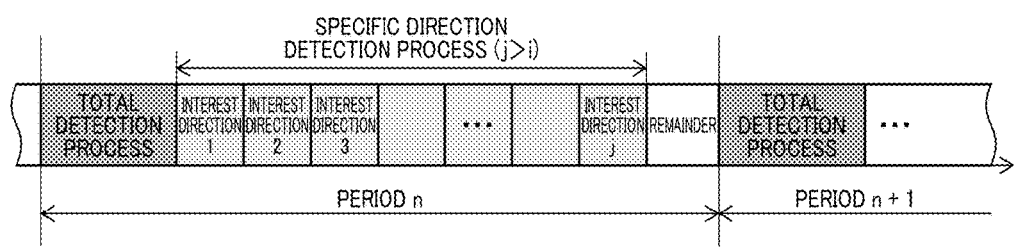
(b)

FIG.7
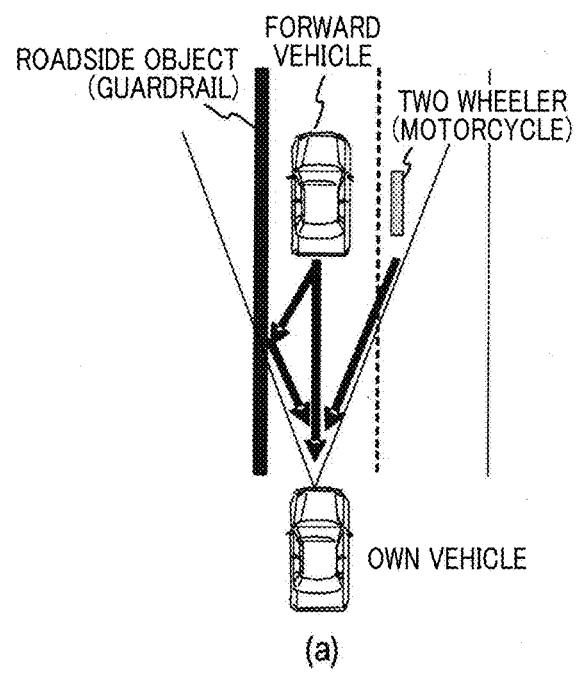
(a)
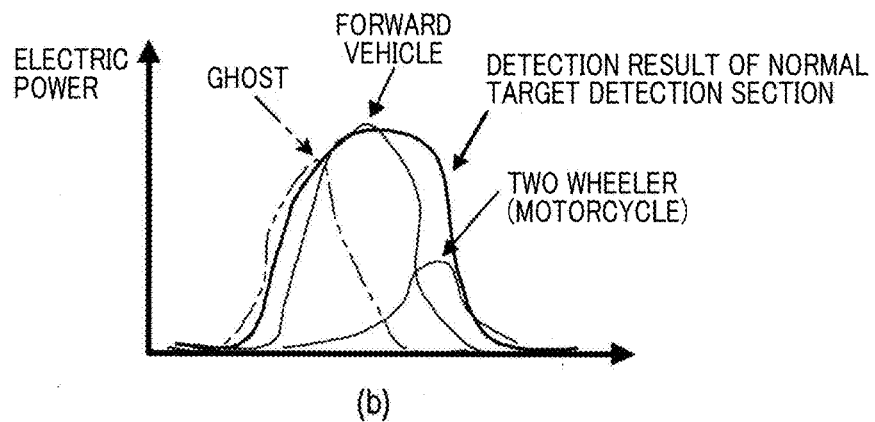
(b)
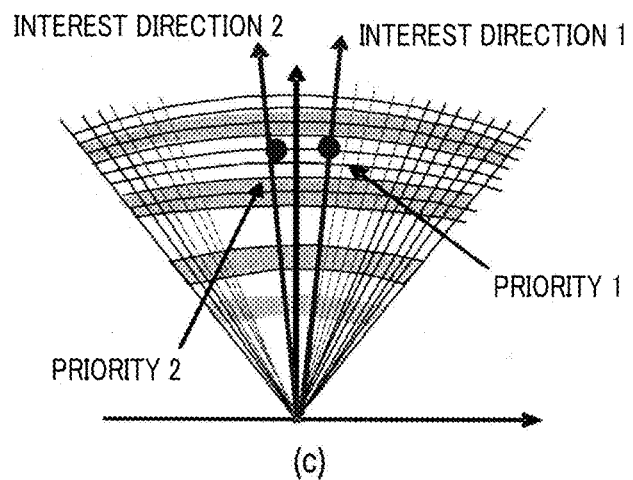
(c)

FIG.9
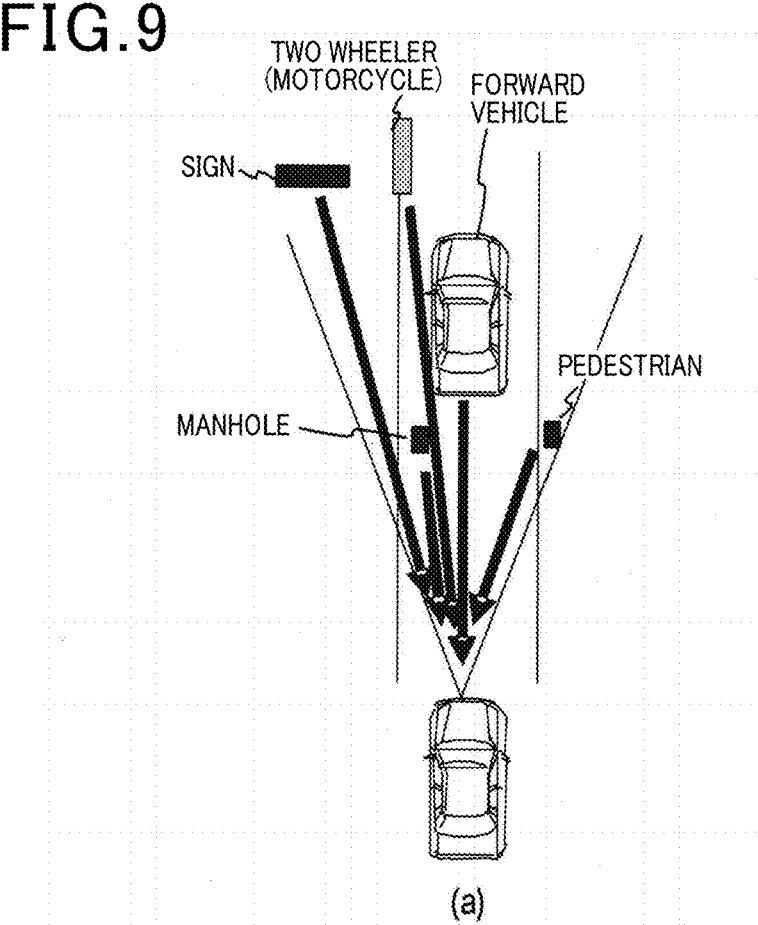
(a)
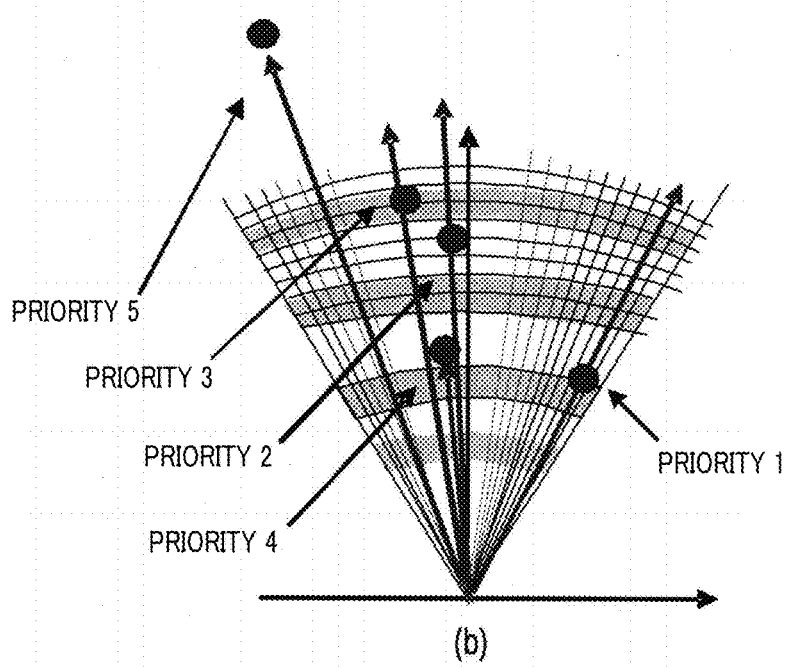
(b)

TARGET RECOGNITION APPARATUS

TECHNICAL FIELD

The present invention relates to a target recognition apparatus which recognizes a target present around a vehicle by using information from a radar sensor and an image sensor.

BACKGROUND ART

Conventionally, a technique is known which is for recognizing a target present around a vehicle by sensor fusion using information from a radar sensor and an image sensor, to use the recognized target for driving support for the vehicle. According to such a technique, detection results individually detected by a radar sensor and a camera sensor are combined to improve the accuracy in detecting an object (for example, refer to patent literature 1).

CITATION LIST

Patent Literature

[Patent Literature 1] JP-A-2009-19914

SUMMARY OF INVENTION

Technical Problem

Meanwhile, it is difficult for a millimeter wave radar, which is one type of radar sensor, to individually and separately detect a plurality of targets which are close to each other, due to the spread of radio waves (millimeter waves). There is a problem that the plurality of targets are detected as one target. Hence, there is a problem that the accuracy in recognizing a target by using sensor fusion lowers when using the detection results of the millimeter wave radar.

Solution to Problem

One embodiment improvers the accuracy in detecting a target in a target recognition apparatus in which a sensor using electromagnetic waves and an image sensor are installed.

A target recognition apparatus of one embodiment is installed in a vehicle, and includes a data acquisition means which acquires received data from a transceiver having a plurality of transmission and receiving channels which transmit and receive radar waves; an image acquisition means which acquires image data from an image sensor which picks up an image of a state around an own vehicle; and a detection means which detects a target which has reflected the radar waves based on the received data and the image data.

BRIEF DESCRIPTION OF DRAWINGS

FIG. 3 is a flowchart showing a process of target recognition;
FIG. 4 is a flowchart showing a normal detection process;
FIG. 6 (*a*) is an explanatory diagram showing that a total detection process and a specific direction detection process are performed by time sharing in one cycle;
FIG. 6 (*b*) is an explanatory diagram showing that more specific direction detection processes are performed when throughput of a CPU is higher than that in a case of (*a*);
FIG. 7 (*a*) is an explanatory diagram showing a situation in which, on an automobile road, a forward vehicle and a motorcycle are present ahead of an own vehicle, and the forward vehicle is running close to the motorcycle and a guardrail;
FIG. 7 (*b*) is an explanatory diagram showing processing results of DBF.
FIG. 7 (*c*) is an explanatory diagram showing priorities of interest directions;
FIG. 8 (*b*) is an explanatory diagram showing processing results of DBF;
FIG. 8 (*c*) is an explanatory diagram showing priorities of interest directions;
FIG. 9 (*a*) is an explanatory diagram showing a situation in which, in addition to the situation shown in FIG. 8 (*a*), a sign and a manhole are present close to each other;
FIG. 9 (*b*) is an explanatory diagram showing priorities of interest directions.

DESCRIPTION OF EMBODIMENTS

Hereinafter, embodiments of the present invention are described with reference to the drawings.

<First Embodiment>
<General Configuration>

Figure 1:
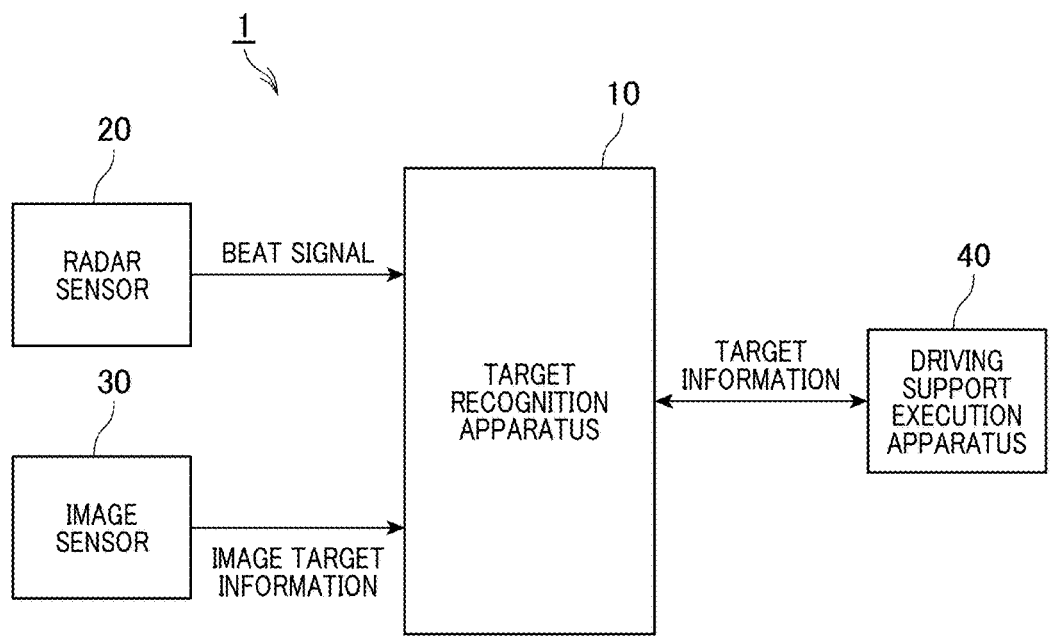
FIG. 1 is a block diagram showing a configuration of a target recognition apparatus of a first embodiment.

As shown in FIG. 1, in a driving support system 1 to which a target recognition apparatus 10 of the present invention is applied, the target recognition apparatus 10 is connected to each of a radar sensor 20, an image sensor 30, and a driving support execution apparatus 40 so that the target recognition apparatus 10 can communicate with them. The radar sensor 20 radiates radar waves toward a probe region set ahead of an own vehicle and receives reflected waves therefrom. The image sensor 30 picks up an image of the probe region. The target recognition apparatus 10 recognizes various targets present in the probe region according to detection results of the radar sensor 20 and the image sensor 30. The driving support execution apparatus 40 controls various in-vehicle units according to processing results (target information) of the target recognition apparatus 10 to perform predetermined driving support.

<Radar Sensor>

The radar sensor 20 is set at the front portion of the own vehicle. The radar sensor 20 configures a known FMCW (Frequency Modulated Continuous Wave) radar, which detects a target present in a predetermined probe region by using millimeter waves, together with a target detection apparatus (especially, normal detection process) 10 described later.

Specifically, the radar sensor 20 is disposed at a front end portion of the vehicle. The radar sensor 20 transmits transmission waves, in which the frequency is linearly increased (up modulation) and decreased (down modulation) with respect to time, to the probe region, and receives radio waves reflected from a forward target. The radar sensor 20 mixes the transmission waves and the received waves to extract a beat signal having a beat frequency corresponding to a distance R and a relative speed V between the radar sensor 20 and the target.

Note that, in the radar sensor 20, at least one of a transmission antenna and a receiving antenna is configured by an array antenna. The combination of the transmission antenna and the receiving antenna is referred to as a channel. The radar sensor 20 extracts a beat signal from each of the channels. The radar sensor 20 performs AD conversion of the beat signal by using an AD converter and outputs the converted beat signal. The outputted beat signal is inputted into the target recognition apparatus 10.

<Image Sensor>

Figure 2:
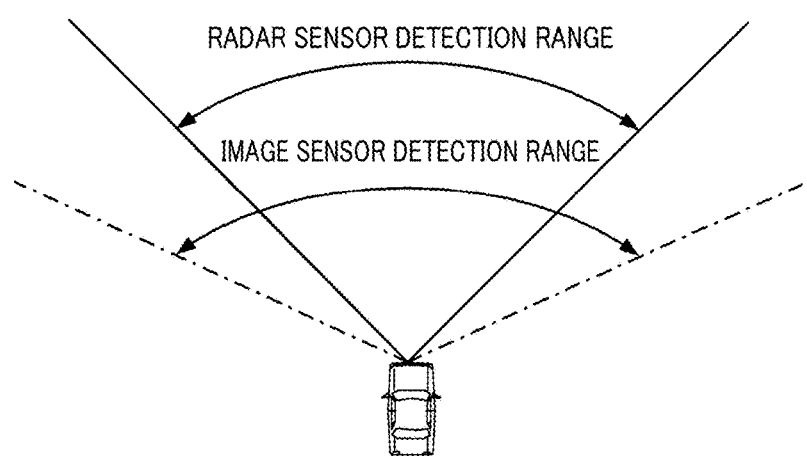
FIG. 2 is an explanatory diagram showing detection ranges of a radar sensor and an image sensor.

The image sensor 30 is configured by a CCD camera disposed in the vicinity of the center of the front side of the own vehicle. This CCD camera has a detection range which has an angular range wider than the detection range of the radar sensor 20 (refer to FIG. 2). The image sensor 30 performs known image processing such as template matching for image data picked up by the CCD camera to detect a predetermined target (vehicle, pedestrian or the like) present within an imaging range.

Then, the image sensor 30 transmits information on a target (hereinafter, referred to as image target) detected by this processing as image target information to the target recognition apparatus 10. Note that the image target information includes information on the type, magnitude, and position (distance, direction) of the detected image target.

<Driving Support Execution Apparatus>

The driving support execution apparatus 40 includes, as in-vehicle units to be controlled, a monitor which displays various images and a loudspeaker which outputs warning sounds and guidance sounds. The driving support execution apparatus 40 may further include various control units, as in-vehicle units to be controlled, which control an internal-combustion engine, a powertrain mechanism, and a brake mechanism and the like installed in the own vehicle.

<Target Recognition Apparatus>

The target recognition apparatus 10 is mainly configured by a microcomputer including a CPU, a ROM and a RAM, and further include a digital signal processor (DSP) for performing signal processing such as the fast Fourier transform (FFT) and the like. The target recognition apparatus 10 performs a target recognition process which generates target information to be provided to the driving support execution apparatus 40 according to image target information acquired from the image sensor 30 and a beat signal acquired from the radar sensor 20. In the target recognition apparatus 10, the CPU performs a program stored in the ROM to perform the target recognition process.

<Target Recognition Process>

The target recognition process is described according to a flowchart shown in FIG. 3. When an engine starts, the present process is repeatedly performed at predetermined measurement cycles.

First, in S10, the target recognition apparatus 10 acquires a beat signal generated from each of the channels from the radar sensor 20. Next, in S20, the target recognition apparatus 10 performs a normal detection process. In the normal detection process, a distance and a relative speed between each target candidate and the own vehicle are detected by using a known method using an FMCW radar. Next, in S30, the target recognition apparatus 10 acquires image target information generated by the image sensor 30. In next S40, the target recognition apparatus 10 performs a specific direction detection process using interest directions described later extracted from the image target information, and completes the present process.

<Normal Detection Process>

Next, the normal detection process performed in S20 of the target recognition process is described according to a flowchart shown in FIG. 4.

First, in S110, the target recognition apparatus 10 detects a distance to a target by performing a distance FFT. That is, the target recognition apparatus 10 performs the fast Fourier transform (FFT) in the time-series direction for the acquired beat signal, for each of the channels and for each modulation period (up modulation/down modulation). Then, the target recognition apparatus 10 extracts a frequency (peak frequency), as a processing result of the FFT, whose signal strength exceeds a predetermined threshold value and which becomes the peak on the frequency axis.

In next S120, the target recognition apparatus 10 extracts, for each peak frequency extracted in S110, signal components (amplitude, phase) in each channel at the peak frequency. The target recognition apparatus 10 uses the extracted signal components to estimate the direction of a target by a known digital beam forming (DBF).

Next, in S130, the target recognition apparatus 10 performs a pair match process in which, for a frequency group of the peak frequencies extracted in S110, peak frequencies considered to be a pair (hereinafter, refer to as peak pair) generated based on reflected waves from the same target are identified between both modulation periods (up modulation period/down modulation period), based on peak signal strength, results of direction detection in S120, and past history information.

Then, for each peak pair identified in the pair match process, the target recognition apparatus 10 calculates a distance R and a relative speed V between the target recognition apparatus 10 and each target from the peak frequency (hereinafter, referred to as beat frequency) fbu (beat frequency in up modulation), fbd (beat frequency in down modulation), based on the expressions (1) and (2).

[Expression 1]

$$\text{Distance } R=(|fbu|+|fbd|)/2 \quad (1)$$

[Expression 2]

$$\text{Relative speed } V=(|fbu|-|fbd|)/2 \quad (2)$$

Finally, in S140, the target recognition apparatus 10 outputs the calculation results (distance, relative speed, direction) as normal target detection information.

<Specific Direction Detection Process>

Figure 5:
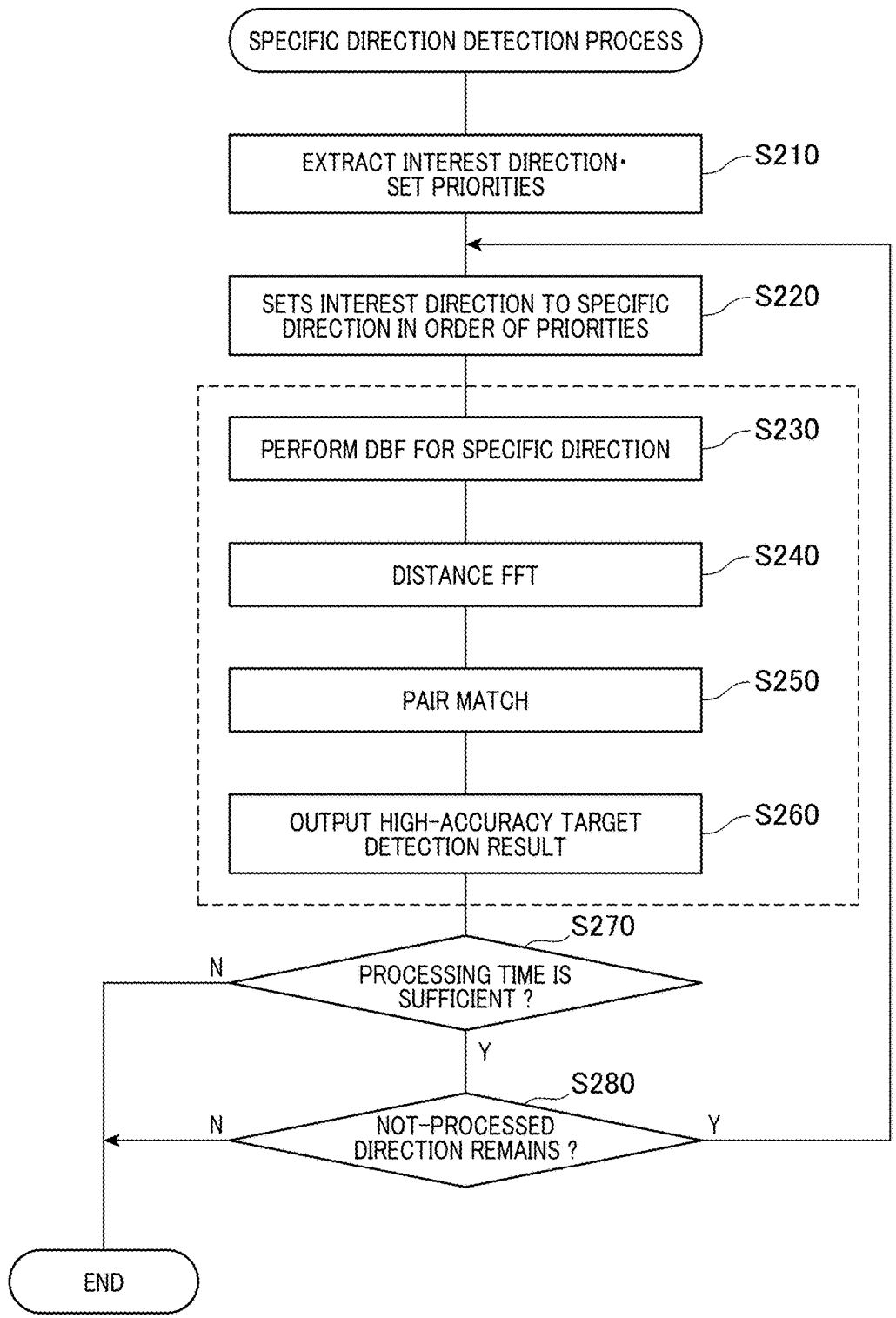
FIG. 5 is a flowchart showing a specific direction detection process.

Next, the specific direction detection process is described according to a flowchart shown in FIG. 5.

First, in S210, the target recognition apparatus 10 extracts one or more interest directions satisfying predetermined interest information by using image target information (type, distance, direction) acquired by the image sensor 30, to set priorities of the interest directions.

The interest direction is a direction in which information on a target is required to be exactly acquired. The interest direction may be a direction, for example, in which a target is present which becomes an obstacle when the vehicle runs, or may be a direction in which a roadside object is present which is used for recognizing a traveling lane on which the own vehicle runs.

Specifically, the target recognition apparatus 10 extracts, as an interest direction, a direction in which a person (pedestrian), a vehicle and the like, which are detected by performing image processing such as known template matching processing, edge extraction processing or the like by the image sensor 30, are present, a direction in which a roadside object such as a manhole, a sign or the like is present, or a direction which requires attention estimated from a direction in which a white line and a guard rail are present.

In addition, the priorities of interest directions may have a characteristic that, for example, the priorities are higher in order of a direction in which a pedestrian is present, a direction in which a two wheeler (motorcycle) is present, a direction in which a vehicle is present, and a direction in which a roadside object is present.

In addition, the priorities of interest directions may have a characteristic that the priorities are higher in a direction in which a target is present which is positioned near the own vehicle. Further, the priorities of interest directions may have a characteristic that the priority is higher in a direction in which a target is present which is positioned near the front direction of the own vehicle. In addition, the priorities of interest directions may have a characteristic that the priorities are higher in a direction in which a target is present which is approaching the own vehicle.

Next, in S220, the target recognition apparatus 10 sets the interest direction having the highest priority, which is included in the interest directions which have not been subject to high-accuracy retrieval processing in S230 to S260 described later, as a specific direction. In next S230, the target recognition apparatus 10 performs the DBF, which uses the specific direction as an azimuth angle, by using the beat signal acquired in S10. Next, in S240, the target recognition apparatus 10 performs the distance FFT for data row acquires as the result of the DBF in S230 to extract peak frequencies.

In next S250, the target recognition apparatus 10 performs a pair match process, which is similar to the process performed in S130 of the normal detection process, for a frequency group of the peak frequencies extracted in S240 to calculate the distance R and the relative speed V. Next, in S260, the target recognition apparatus 10 outputs the calculation results (distance, relative speed, direction) as high-accuracy target detection information.

Here, if processing time is sufficient (S270: YES), and the interest direction remains which has not been subject to the high-accuracy detection processing (S280: YES), the present process proceeds to S220. Next, the target recognition apparatus 10 sets the interest direction having higher priority as a specific direction to perform a series of the high-accuracy detection processing. Here, upper time required for performing the high-accuracy detection processing once is defined as high-accuracy detection upper time. If the remaining processing time included in one cycle of processing time is equal to or more than the high-accuracy detection upper time, in S270, the target recognition apparatus 10 determines that the processing time is sufficient.

Meanwhile, if the processing time is not sufficient (S270: NO), or the interest direction is not present for which the high-accuracy detection processing has not been performed (S280: NO), the present process is completed.

That is, as shown in FIG. 6(a), the target recognition process is repeated at predetermined cycles. In one cycle of processing time, the normal detection process and the high-accuracy detection processing for as many as possible of the interest directions are performed. For example, as shown in FIG. 6(b), as throughput of the CPU becomes higher, the high-accuracy detection processing is performed for more many interest directions.

<Operation Example>

A calculation example of the result of the target detection of the normal detection process and a calculation example of the result of the high-accuracy target detection of the specific direction detection process are described with reference to FIGS. 7 to 9.

<Operation Example 1>

FIG. 7 (a) shows a situation in which, on an automobile road, a (forward) vehicle and a two wheeler (motorcycle) are present ahead of the own vehicle, and the forward vehicle is running close to the motorcycle and a guardrail. In such a situation, in the normal detection process, the forward vehicle and the motorcycle which are close to each other are detected as an integrated target (refer to a thick line in FIG. 7(b)).

Note that, in this situation, in the normal detection process, a target (hereinafter, referred to as ghost), which is recognized that as if the target is moving at a relative speed with respect to the own vehicle, may be erroneously detected at a position, where reflected waves are generated, by the reflected waves from the guardrail close to the vehicle (refer to a chain double-dashed line in FIG. 7(b)).

In contrast to this, in the specific direction detection process, the direction can be recognized in which a forward vehicle, a motorcycle, and a guardrail are present, from the acquired image target information. Hence, by performing the high-accuracy detection processing with the forward vehicle and the motorcycle, excluding the guardrail, regarded as the interest directions, each of the forward vehicle and the motorcycle is restrained from being influenced by other targets, and the forward vehicle and the motorcycle are individually detected as shown in FIG. 7(b).

Note that, in this situation, as shown in FIG. 7C, the direction in which the motorcycle is present is set as an interest direction 1 having the highest priority, and the direction in which the forward vehicle is present is set as an interest direction 2 having the second highest priority. In this case, the motorcycle is detected prior to the forward vehicle.

<Operation Example 2>

Figure 8:
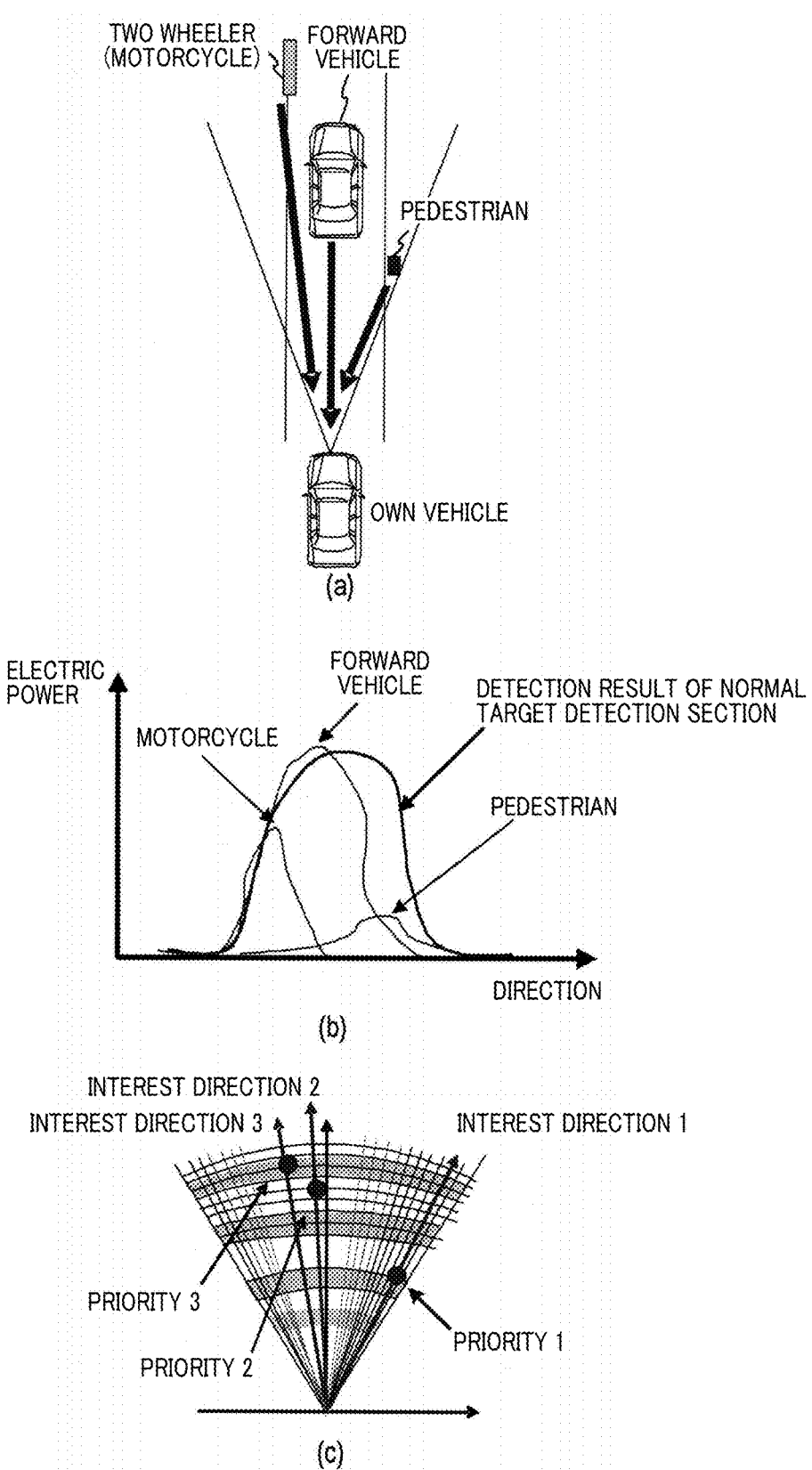
FIG. 8 (*a*) is an explanatory diagram showing a situation in which, in an urban area, a motorcycle, a forward vehicle, and a pedestrian are present close to each other ahead of the own vehicle.

FIG. 8 (a) shows a situation in which, in an urban area, a motorcycle, a forward vehicle, and a pedestrian, which are close to each other, are present ahead of the own vehicle. In such a situation, in the normal detection process, the motorcycle, the forward vehicle, and the pedestrian are detected as an integrated target (refer to a thick line in FIG. 8(b)).

In contrast to this, in the specific direction detection process, by performing the high-accuracy detection processing with each of the motorcycle, the forward vehicle, and the pedestrian regarded as being in the interest direction, as shown in FIG. 8(b), the motorcycle, the forward vehicle, and the pedestrian are individually and separately detected. Note that, in this situation, the forward vehicle is positioned closer to the own vehicle than the motorcycle. Hence, as shown in FIG. 8(c), the direction in which the forward vehicle is present is set as the interest direction 2 having the second highest priority, and the direction in which the motorcycle is present is set as an interest direction 3 having the third highest priority. In this case, after the pedestrian is first detected, the forward vehicle is detected prior to the motorcycle.

FIG. 9 (a) shows a situation in which, in addition to the situation shown in FIG. 8 (a), a sign and a manhole are present close to the motorcycle and the forward vehicle. In such a situation, in the specific direction detection process, as shown in FIG. 9(b), the manhole positioned close to the own vehicle is set as an interest direction 4 having the fourth highest priority, and the sign is set as an interest direction 5 having the fifth highest priority. In this case, after the manhole is detected, the sign is detected.

<Advantages>

As described above, the target recognition apparatus 10 first performs the normal detection process which is a target recognition process as a known FMCW radar to detect a target over the whole search range.

Furthermore, after the normal detection process is performed, the target recognition apparatus 10 performs the specific direction detection process by using the interest direction based on the image target information to detect the target present in the interest direction with accuracy higher than that obtained when the normal detection process is performed.

Hence, by performing the normal detection process, the target recognition apparatus 10 can acquire detection results of the target (normal target detection information) regarding the whole search range. Furthermore, by performing the specific direction detection process for the target present in a range requiring specifically accurate detection, the target recognition apparatus 10 performs the specific direction detection process to acquire the detection results having higher accuracy (high-accuracy target detection information).

In addition, by performing the specific direction detection process, the target recognition apparatus 10 can also detect a target whose signal strength of the peak frequency has not exceeded the predetermined threshold value in the distance FFT performed in the normal detection process.

Specifically, as shown in FIGS. 7 to 9, when a plurality of targets, which are positioned close to each other, are present ahead of the own vehicle, the target (e.g. a pedestrian, a motorcycle, or the like present near the own vehicle) to be an object for avoidance control may be required to be accurately detected. The target recognition apparatus 10 of the present embodiment can be properly utilized for such an application.

In addition, in a situation in which the forward vehicle is present close to a roadside object, such as a guardrail, continuously positioned along a traveling road, the target recognition apparatus 10 performs the specific direction detection process with only the direction in which the forward vehicle is present regarded as the interest direction. Hence, for the forward vehicle, target detection results having high accuracy, in which influence of ghost due to the reflected wave from the guardrail is restrained, can be obtained.

Furthermore, the target recognition apparatus 10 is configured so as to, after acquiring the normal target detection information, acquire high-accuracy target detection information regarding as many as possible of interest directions. Hence, the driving support execution apparatus 40, which controls various in-vehicle units according to the target information which are processing results of the target recognition apparatus 10, can perform predetermined driving support with higher accuracy.

S10 shown in FIG. 3 corresponds to a data acquisition means. S30 corresponds to an image acquisition means. S40 corresponds to a detection means. In addition, S210 shown in FIG. 5 corresponds to an interest direction extraction means and an order setting means. S230 to S260 correspond to a target detection performing means. In addition, S110 and S130 shown in FIG. 4 correspond to a distance calculation means. S120 and S130 correspond to a direction calculation means.

In addition, the radar sensor 20 corresponds to a transceiver. The beat signal corresponds to received data. In addition, the channel, which is a combination of the transmission antenna and the receiving antenna of the radar sensor 20, corresponds to a transmission and receiving antenna.

<Second Embodiment>

The second embodiment is described.

Figure 10:
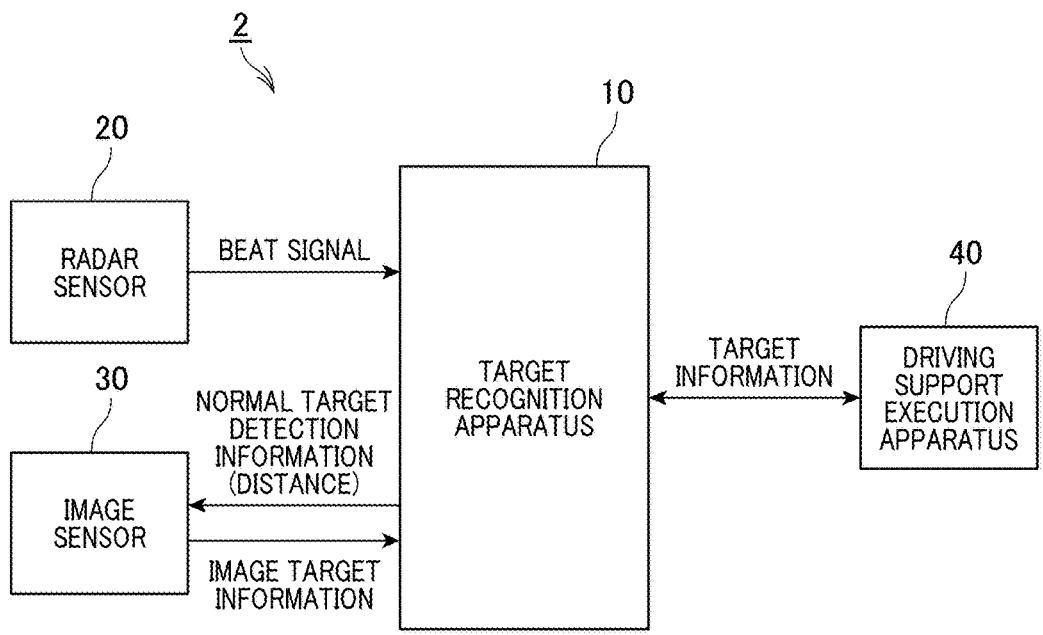
FIG. 10 is a block diagram showing a configuration of a target recognition apparatus of a second embodiment.

A driving support system 2 shown in FIG. 10 differs from the first embodiment in that the normal target detection information is outputted from the target recognition apparatus 10 to the image sensor 30. In addition, associated with this, as shown in FIG. 11, the driving support system 2 differs from the first embodiment in that S150 is added to the normal detection process shown in FIG. 4.

Figure 11:
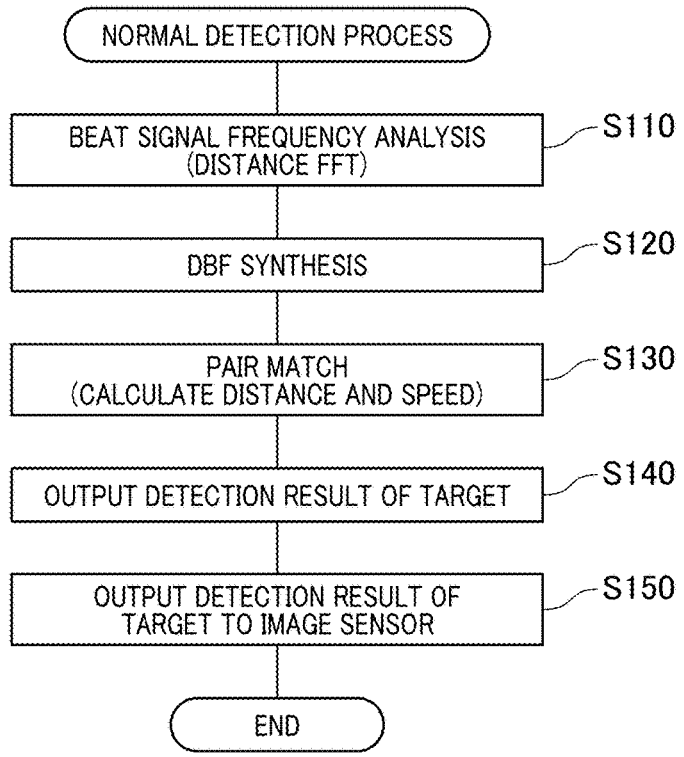
FIG. 11 is a flowchart showing a normal detection process of the second embodiment.

That is, according to the normal detection process of the present embodiment, as shown in FIG. 11, after the steps until S140 are performed, the normal target detection information (distance, direction) is outputted to the image sensor 30 in S150. Then, the present process is completed.

According to the driving support system 2 configured as described above, the image sensor 30 estimates the range in the imaging screen where a target candidate is present based on the normal target detection information, and performs an image recognition process such as pattern matching only for this estimated setting range. That is, in a picked up image acquired by the image sensor 30, the range from which the interest direction is extracted is limited to this setting range. Hence, the throughput of the image processing can be reduced.

<Other Embodiments>

Hereinbefore, embodiments of the present invention are described. However, the present invention is not limited to the above embodiments, but can be implemented in various aspects within the scope which does not deviate from the subject matter of the present invention.

(1) In the above embodiments, DBF is performed in S120 shown in FIG. 4. Instead of this, another known direction calculation (e.g. direction FET) may be performed in S120.

(2) In the above embodiments, the target recognition apparatus 10 is configured so as to perform the normal detection process and the specific direction detection process by time sharing. However, this is not a limitation. The target recognition apparatus 10 may be configured so as to perform the normal detection process and the specific direction detection process in parallel.

(3) In the above embodiments, the direction is provided in which a pedestrian, a vehicle, a motorcycle, a roadside object or the like is present, as an example of the interest direction. However, this is not limitation. The direction in which another person or object is present may be regarded as the interest direction. In addition, the priorities of interest directions may have characteristics depending on process contents performed by the driving support execution apparatus 40.

(4) In the above embodiments, the search ranges of the radar sensor 20 and the image sensor 30 are set ahead of the own vehicle. However, this is not limitation. The search range may be the periphery of the own vehicle, for example, backward, lateral or the like of the own vehicle.

(5) In the above embodiments, an example is explained in which the target recognition apparatus 10 is applied to an apparatus installed in an automobile. However, this is not a limitation. The target recognition apparatus 10 may be installed in a motorcycle, an electric train, another car or the like.

(6) Components of the target recognition apparatus 10 exemplified in the above embodiments may be realized by hardware, software, or a combination of hardware and software. For example, a computer unit (e.g. microcomputer) performing the process (program) described above may configure at least part of the target recognition apparatus 10. In addition, these components are functional and conceptual parts, and part or the whole of the components may be separated or integrated functionally or physically.

(7) The above embodiments are only examples of embodiments to which the present invention is applied. The present invention can be realized in various aspects such as a target recognition apparatus, a target recognition method, a program for allowing a computer to function as the target recognition apparatus, and a recording medium storing the program.

The above target recognition apparatus is installed in a vehicle. The data acquisition means acquires received data from the transceiver having a plurality of transmission and receiving channels which transmit and receive radar waves. In addition, the image acquisition means acquires image data from the image sensor which picks up an image of a state around the own vehicle. In addition, the detection means detects a target which has reflected radar waves based on the received data and the image data.

In the detection means, the interest direction extraction means extracts one or more interest directions, in which information on a target is required to be exactly acquired, from the image data acquired by the image acquisition means. The target detection performing means performs the beam forming for each of the interest directions by using the received data acquired by the data acquisition means, to perform target detection by using the data row acquired by performing beam forming.

According to the target recognition apparatus, the direction of the target is detected as an interest direction extracted from the image data, and the distance to the target is detected by performing the beam forming for each of the interest direction. Hence, by using the information of the radar sensor and the image sensor, the target present around the own vehicle can be accurately detected.

REFERENCE SIGNS LIST 1, 2 . . . driving support system
10 . . . target recognition apparatus
20 . . . radar sensor
30 . . . image sensor
40 . . . driving support execution apparatus

The invention claimed is:

1. A target recognition apparatus which is installed in a vehicle, the apparatus comprising:
   a data acquisition means which acquires received data from a transceiver having a plurality of transmission and receiving channels which transmit and receive radar waves;
   an image acquisition means which acquires image data from an image sensor which picks up an image of a state around an own vehicle; and
   a detection means which detects a target which has reflected the radar waves based on the received data and the image data, the detection means comprising:
      an interest direction extraction means which extracts one or more interest directions, in which information on the target is required to be exactly acquired, from the image data acquired by the image acquisition means, and
      a target detection performing means which performs beam forming for each of the interest directions by using the received data acquired by the data acquisition means, to perform target detection by using a data row acquired by performing the beam forming.

2. The target recognition apparatus according to claim 1, wherein the target detection performing means performs distance FFT for the data row acquired by performing the beam forming.

3. The target recognition apparatus according to claim 1, further comprising:
   a distance calculation means which performs distance FFT for the received data acquired by the data acquisition means for each of the transmission and receiving channels to detect peak frequencies, and performs direction calculation; and
   a direction calculation means which performs direction detection for each of the peak frequencies detected by the distance calculation means.

4. The target recognition apparatus according to claim 3, wherein, in the image data acquired by the image acquisition means, a range from which the interest direction is extracted by the interest direction extraction means is limited to a setting range set by using the distance calculated by the distance calculation means and the direction calculated by the direction calculation means.

5. The target recognition apparatus according to claim 1, wherein
   the interest direction extraction means includes an order setting means which sets priorities for a plurality of interest directions extracted from the image data; and
   the target detection performing means performs the beam forming according to the priorities set by the order setting means.

6. The target recognition apparatus according to claim 1, wherein the interest direction extraction means uses, as the interest direction, a direction in which the target which is an obstacle is present when the vehicle runs.

7. The target recognition apparatus according to claim 1, wherein the interest direction extraction means uses, as the interest direction, a direction in which a roadside object is present which is used for recognizing a traveling lane on which the own vehicle runs.

8. A method for recognizing a target, the method comprising:
   acquiring received data from a transceiver having a plurality of transmission and receiving channels which transmit and receive radar waves;
   acquiring image data from an image sensor which picks up an image of a state around an own vehicle;
   detecting a target which has reflected the radar waves based on the received data and the image data;
   extracting one or more interest directions, in which information on the target is required to be exactly acquired, from the image data; and
   performing beam forming for each of the interest directions by using the received data to perform target detection by using a data row acquired by performing the beam forming.

9. The method according to claim 8, further comprising performing distance FFT for the data row acquired by performing the beam forming.

10. The method according to claim 8, further comprising:
   performing distance FFT for the received data for each of the transmission and receiving channels to detect peak frequencies, and performing direction calculation; and
   performing direction detection for each of the peak frequencies detected.

11. The method according to claim 8, further comprising:
   setting priorities for a plurality of interest directions extracted from the image data; and
   performing the beam forming according to the priorities set.

12. The method according to claim 8, further comprising using, as the interest direction, a direction in which the target which is an obstacle is present when the vehicle runs.

13. The method according to claim 8, further comprising using, as the interest direction, a direction in which a roadside object is present which is used for recognizing a traveling lane on which the own vehicle runs.

14. A system installed in a vehicle for recognizing a target, the system comprising:
   a transceiver;
   an image sensor;
   a central processor;
   a non-transitory computer-readable storage medium; and
   a set of computer-executable instructions stored on the computer-readable storage medium that cause the central processor to implement:
      acquiring received data from the transceiver having a plurality of transmission and receiving channels which transmit and receive radar waves;
      acquiring image data from the image sensor which picks up an image of a state around an own vehicle;
      detecting a target which has reflected the radar waves based on the received data and the image data;
      extracting one or more interest directions, in which information on the target is required to be exactly acquired, from the image data; and
      performing beam forming for each of the interest directions by using the received data to perform target detection by using a data row acquired by performing the beam forming.

15. The system according to claim 14, the set of computer-executable instructions further causing the central processor to implement:
   performing distance FFT for the data row acquired by performing the beam forming.

16. The system according to claim 14, the set of computer-executable instructions further causing the central processor to implement:
   performing distance FFT for the received data for each of the transmission and receiving channels to detect peak frequencies, and performing direction calculation; and
   performing direction detection for each of the peak frequencies detected.

17. The system according to claim 14, the set of computer-executable instructions further causing the central processor to implement:
   setting priorities for a plurality of interest directions extracted from the image data; and
   performing the beam forming according to the priorities set.

18. The system according to claim 14, the set of computer-executable instructions further causing the central processor to implement:
   using, as the interest direction, a direction in which the target which is an obstacle is present when the vehicle runs.

19. The system according to claim 14, the set of computer-executable instructions further causing the central processor to implement:
   using, as the interest direction, a direction in which a roadside object is present which is used for recognizing a traveling lane on which the own vehicle runs.

* * * * *